United States Patent
Lo et al.

(10) Patent No.: US 9,298,304 B2
(45) Date of Patent: Mar. 29, 2016

(54) ELECTRONIC DEVICE AND TOUCH-SENSING METHOD

(75) Inventors: Pi-Lin Lo, Taoyuan County (TW);
Te-Mu Chen, Taoyuan County (TW);
Cheng-Hsi Liu, Taoyuan County (TW);
Yi-Fan Hsueh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 231 days.

(21) Appl. No.: 13/606,026

(22) Filed: Sep. 7, 2012

(65) Prior Publication Data

US 2013/0093701 A1 Apr. 18, 2013

Related U.S. Application Data

(60) Provisional application No. 61/546,069, filed on Oct. 12, 2011.

(51) Int. Cl.
*G06F 3/041* (2006.01)
*G06F 3/0488* (2013.01)

(52) U.S. Cl.
CPC .......... *G06F 3/0416* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 2009/0040193 A1* | 2/2009 | Geaghan | 345/174 |
| 2009/0213092 A1 | 8/2009 | Kuo et al. | |
| 2010/0134422 A1 | 6/2010 | Borras | |
| 2010/0182273 A1 | 7/2010 | Noguchi et al. | |
| 2011/0037713 A1 | 2/2011 | Chen et al. | |
| 2011/0141042 A1 | 6/2011 | Kim et al. | |
| 2011/0210939 A1* | 9/2011 | Reynolds et al. | 345/174 |
| 2011/0227847 A1* | 9/2011 | Yoshiyama | 345/173 |
| 2011/0248944 A1 | 10/2011 | Liu et al. | |
| 2011/0291961 A1* | 12/2011 | Hsieh et al. | 345/173 |
| 2012/0044195 A1* | 2/2012 | Nakanishi et al. | 345/173 |
| 2012/0056834 A1* | 3/2012 | Kim et al. | 345/173 |
| 2013/0069894 A1* | 3/2013 | Chen et al. | 345/173 |

FOREIGN PATENT DOCUMENTS

| | | |
|---|---|---|
| CN | 1529869 | 9/2004 |
| CN | 101017419 | 8/2007 |
| JP | H06-160118 | 6/1994 |
| JP | H07-064702 | 3/1995 |
| JP | 2011-002926 | 1/2011 |

(Continued)

OTHER PUBLICATIONS

Laplante, Philip A., Comprehensive Dictionary of Electrical Engineering, 2005, Second Ed., p. 521.*

(Continued)

*Primary Examiner* — Gerald Johnson
*Assistant Examiner* — Maheen Javed
(74) *Attorney, Agent, or Firm* — Jianq Chyun IP Office

(57) ABSTRACT

An electronic device and a corresponding touch-sensing method are provided. The electronic device includes a display module integrated with a first touch sensor, a second touch sensor, and a sense circuitry. The first touch sensor generates a first sensing signal in response to a first driving signal. The second touch sensor generates a second sensing signal in response to a second driving signal. The sense circuitry is coupled to the first and the second touch sensors. The sense circuitry receives and analyzes the first sensing signal and the second sensing signal.

11 Claims, 4 Drawing Sheets

(56) References Cited

FOREIGN PATENT DOCUMENTS

| JP | 2011-180739 | 9/2011 |
|---|---|---|
| JP | 2011-198009 | 10/2011 |
| KR | 20110081040 | 7/2011 |
| TW | M246655 | 10/2004 |
| TW | 201205399 | 2/2012 |
| WO | 2010126072 | 11/2010 |

OTHER PUBLICATIONS

"Office Action of German co-pending Application", issued on Sep. 23, 2013, p. 1-p. 5.

"Office Action of Korean Counterpart Application", issued on Nov. 15, 2013, with English translation thereof, p. 1-p. 8.

"Office Action of Japan Counterpart Application", issued on Jan. 7, 2014, p. 1-p. 3.

"Office Action of European Counterpart Application", issued on Sep. 29, 2014, p. 1-p. 5.

"Office Action of Taiwan Counterpart Application", issued on Nov. 28, 2014, p. 1-p. 9.

"Office Action of U.S. Related Application, U.S. Appl. No. 13/773,617," issued on Jun. 30, 2015, p. 1-p. 19.

"Office Action of United States Counterpart Application", issued on Nov. 21, 2014, p. 1-p. 30.

"Office Action of Taiwan Counterpart Application", issued on Jan. 8, 2015, p. 1-p. 10.

"Office Action of U.S. Counterpart Application, U.S. Appl. No. 13/773,617" issued on Mar. 6, 2015, p. 1-p. 27.

"Office Action of China Counterpart Application", issued on Feb. 28, 2015, p. 1-p. 11.

"Office Action of US Related Application, U.S. Appl. No. 13/773,617", issued on Dec. 3, 2015, p1-p15.

\* cited by examiner

ELECTRONIC DEVICE AND TOUCH-SENSING METHOD

CROSS-REFERENCE TO RELATED APPLICATION

This application claims the priority benefits of U.S. provisional application Ser. No. 61/546,069, filed on Oct. 12, 2011. The entirety of the above-mentioned patent application is hereby incorporated by reference herein and made a part of this specification.

BACKGROUND

1. Technical Field

The present invention relates to an electronic device and a touch-sensing method. More particularly, the present invention relates to an electronic device and a method of sensing touch operations on two touch sensors.

2. Background

FIG. 1 is a schematic diagram showing a conventional electronic device 100. The electronic device 100 is a touch-sensitive device, such as a smart phone, a personal digital assistant (PDA), a tablet personal computer (PC), a notebook PC, or a desktop PC. The electronic device 100 includes a touch display 110 and some virtual keys 120. Each virtual key 120 may detect touch operations of the user in the same way as the touch display 110 does.

FIG. 2 is a cross-sectional view showing the electronic device 100. The touch display 110 includes a cover glass 140, a touch sensor 150 and a liquid crystal module (LCM) 160. The size of the display area 132 is the same as the size of the cover glass 140 that exposes the images displayed by the LCM 160. The touch active area 131 is the touch-sensitive surface of the electronic device 100. The size of the touch active area 131 is the same as the size of the touch sensor 150. The touch sensor 150 extends beyond the size of the cover glass 140 that exposes the images displayed by the LCM 160 and the LCM 160 and extends under the virtual keys 120. Therefore, the touch active area 131 covers the display area 132 and the virtual key area 133. The user may make selections by simply touching the display area 132 or the virtual key area 133 via a finger or stylus. In general, the electronic device 100 may recognize the positions of touch events induced by the user on the touch active area 131 by scanning the touch sensor 150 and then perform actions based on the touch events.

In FIG. 2, the touch sensor 150 and the LCM 160 are separate components. Since fabrication technology is always getting improved, there is always a trend of integrating related components into a single one to reduce complexity and cost of the entire system. Recently, the in-cell and on-cell technology enable the integration of the touch sensor and the LCM.

For example, FIG. 3 is a cross-sectional view showing another conventional touch-sensitive electronic device 300. The integrated LCM 360 in the electronic device 300 replaces the touch sensor 150 and the LCM 160 in the electronic device 100. There is a touch sensor (not shown) integrated with the LCM 360. However, since the touch sensor integrated with the LCM 360 has the same size as that of the LCM 360, the touch active area 331 of the electronic device 300 covers the display area 132. The virtual keys 120 of the electronic device 300 cannot work because there is no touch sensor under them.

SUMMARY

Accordingly, the present invention is directed to an electronic device. The electronic device includes an integrated display module and an independent touch sensor. The integrated display module may be used for detecting touch operations on the touch display and the independent touch sensor may be used for detecting touch operations on the virtual keys. Such a touch-sensing device provides a low-cost solution to increase the effectiveness, efficiency and user satisfaction with touch-sensitive electronic devices.

The present invention is also directed to a touch-sensing method. The touch-sensing method increases the effectiveness, efficiency and user satisfaction with touch-sensitive electronic devices in the same way as that of the aforementioned touch-sensing electronic device.

According to an embodiment of the present invention, an electronic device is provided. The electronic device includes an display module integrated with a first touch sensor, a second touch sensor, and a sense circuitry. The display module may be a liquid crystal module (LCM). The first touch sensor generates a first sensing signal in response to a first driving signal. The second touch sensor generates a second sensing signal in response to a second driving signal. The sense circuitry is coupled to the first and the second touch sensors. The sense circuitry receives and analyzes the first sensing signal and the second sensing signal.

According to another embodiment of the present invention, a touch-sensing method is provided, which includes the following steps. Provide a first driving signal to a first touch sensor integrated with an display module, or instruct the first driving signal to be provided to the first touch sensor. Provide a second driving signal to a second touch sensor. Receive and analyze a first sensing signal generated by the first touch sensor in response to the first driving signal. Receive and analyze a second sensing signal generated by the second touch sensor in response to the second driving signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
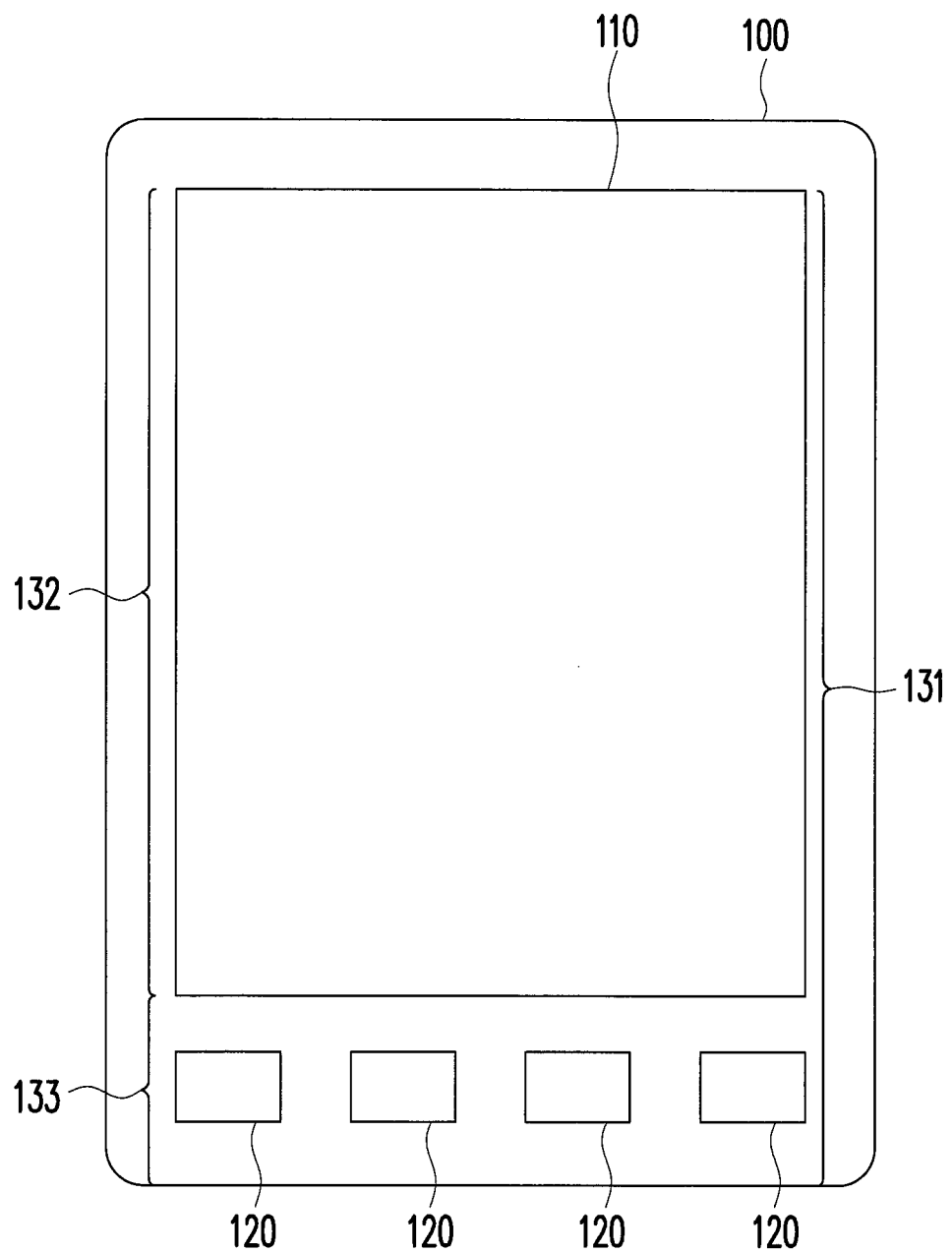
FIG. 1 is a schematic diagram showing a conventional touch-sensitive electronic device.
Figure 2:
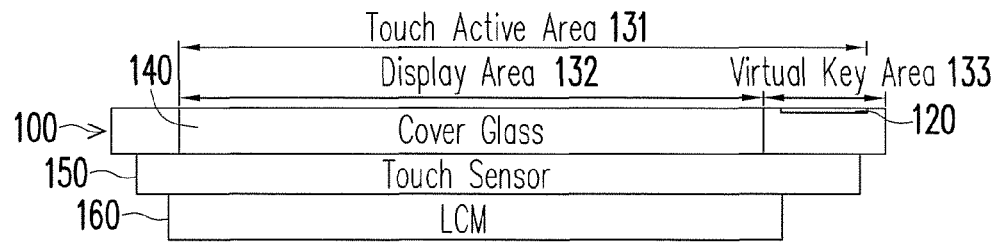
FIG. 2 and FIG. 3 are cross-sectional views showing conventional touch-sensitive electronic devices.
Figure 3:
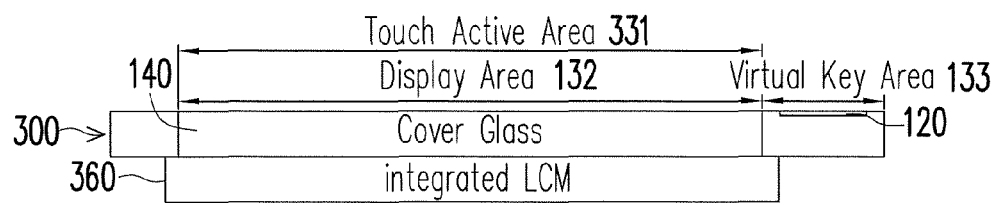

Reference will now be made in detail to the present embodiments of the invention, examples of which are illustrated in the accompanying drawings. Wherever possible, the same reference numbers are used in the drawings and the description to refer to the same or like parts.

Figure 4:
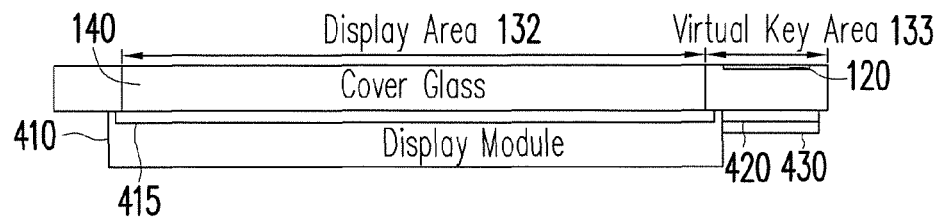
FIG. 4 is a cross-sectional view showing a part of a touch-sensitive electronic device according to an embodiment of the present invention.

FIG. 4 is a cross-sectional view showing a part of a touch-sensitive electronic device 400 according to an embodiment of the present invention. The electronic device 400 may be a smart phone, a PDA, a tablet PC, a notebook PC, or a desktop PC. The electronic device 400 includes a cover glass 140, an integrated display module 410, an touch sensor 415 integrated with the display module 410, a virtual key touch sensor 420, a light guide 430 under the virtual key touch sensor 420, and some virtual keys 120. The touch sensor 415 may be an in-cell touch sensor or an on-cell touch sensor.

Figure 5:
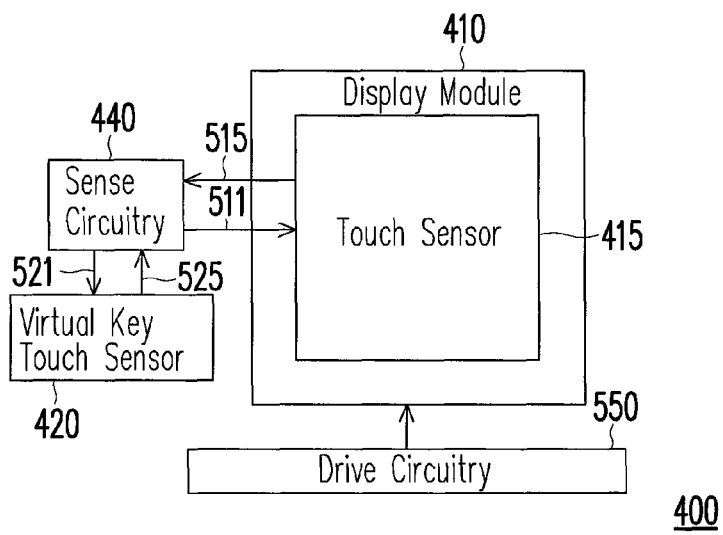
FIG. 5 is a schematic diagram showing a part of a touch-sensitive electronic device according to an embodiment of the present invention.

FIG. 5 is a schematic diagram showing a part of the touch-sensitive electronic device 400 according to an embodiment of the present invention. The electronic device 400 includes the display module 410 integrated with the touch sensor 415, the virtual key touch sensor 420, a sense circuitry 440 and a drive circuitry 550. The sense circuitry 440 may be a touch controller and the drive circuitry 550 may be an LCM driver. The sense circuitry 440 is coupled to the touch sensors 415 and 420. The drive circuitry 550 is coupled to the display module 410. The display module 410 may be a liquid crystal module (LCM), light-emitting diode (LED) module or organic light-emitting diode (OLED) module.

The sense circuitry 440 detects touch events in the display area 132 by scanning the touch sensor 415. In order to scan the touch sensor 415, the sense circuitry 440 provides the driving signal 511 to the touch sensor 415. The touch sensor 415 generates the sensing signal 515 in response to the driving signal 511. The sense circuitry 440 receives and analyzes the sensing signal 515 in order to recognize the positions of the touch events in the display area 132. Similarly, the sense circuitry 440 detects touch events in the virtual key area 133 by scanning the virtual key touch sensor 420. In order to scan the virtual key touch sensor 420, the sense circuitry 440 provides the virtual key driving signal 521 to the virtual key touch sensor 420. The virtual key touch sensor 420 generates the virtual key sensing signal 525 in response to the virtual key driving signal 521. The sense circuitry 440 receives and analyzes the virtual key sensing signal 525 in order to recognize the positions of the touch events in the virtual key area 133. The electronic device 400 may perform functions based on the locations of the touch events detected by the sense circuitry 440. The drive circuitry 550 drives the display module 410 to display an image, such as the graphical user interface (GUI) of the electronic device 400. The touch sensors 415 and 420, the sense circuitry 440 and the drive circuitry 550 are physical circuits.

In an embodiment of the present invention, the sense circuitry 440 may provide the display module driving signal 511 to the touch sensor 415 according to a first timing. The sense circuitry 440 may provide the virtual key driving signal 521 to the virtual key touch sensor 420 according to a second timing. The first timing and the second timing are different. In other words, the sense circuitry 440 does not output the driving signal 511 and the virtual key driving signal 521 at the same moment. Therefore, the scanning of the touch sensor 415 does not interfere with the scanning of the virtual key touch sensor 420.

In another embodiment of the present invention, the sense circuitry 440 may provide the driving signal 511 to the touch sensor 415 at a first frequency. The sense circuitry 440 may provide the virtual key driving signal 521 to the virtual key touch sensor 420 at a second frequency. The first frequency and the second frequency are different. Since the sense circuitry 440 outputs the driving signal 511 and the virtual key driving signal 521 at different frequencies, the scanning of the touch sensor 415 does not interfere with the scanning of the virtual key touch sensor 420.

In still another embodiment of the present invention, the sense circuitry 440 may simultaneously send the driving signal 511 and the virtual key driving signal 521 through the same output terminal to the touch sensor 415 and the virtual key touch sensor 420, respectively. The sense circuitry 440 may send out the driving signal 511 and the virtual key driving signal 521 at different frequencies to avoid interference.

Figure 6:
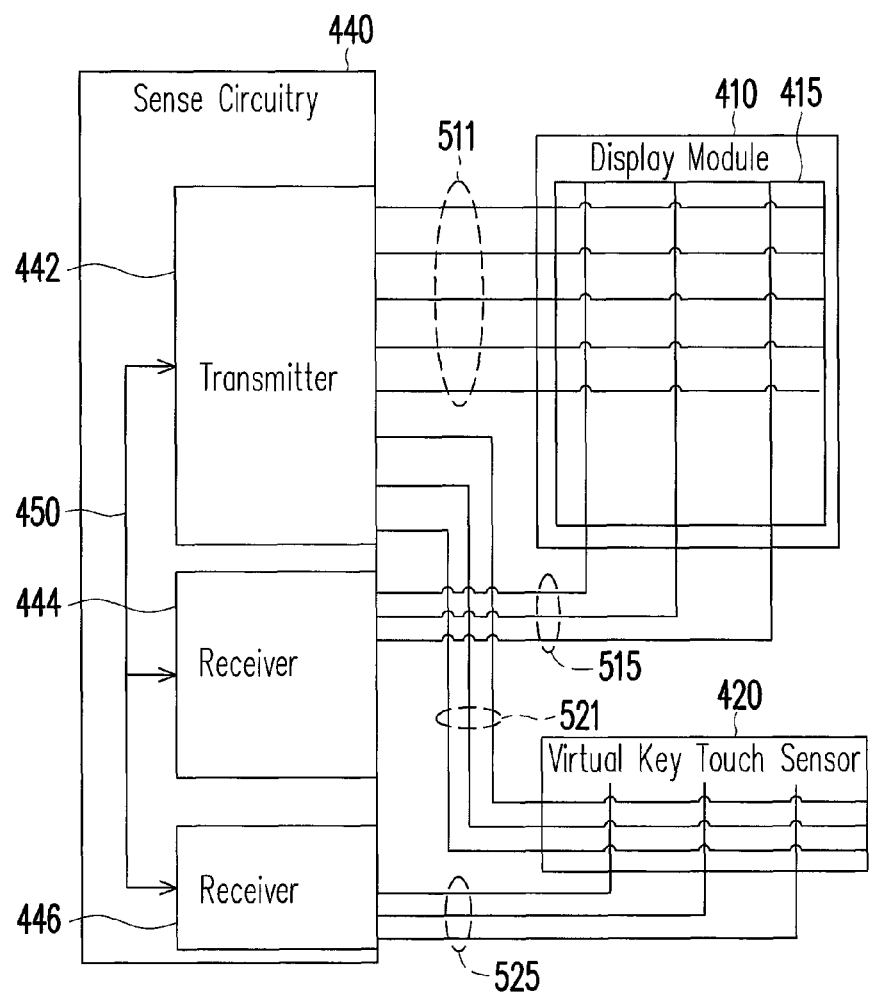
FIG. 6 is a schematic diagram showing a part of a touch-sensitive electronic device according to an embodiment of the present invention.

FIG. 6 is a schematic diagram showing the display module 410, the touch sensor 415, the virtual key touch sensor 420, and the sense circuitry 440 in the electronic device 400. The sense circuitry 440 includes a transmitter 442 and two receivers 444 and 446. The receiver 444 is coupled to the touch sensor 415 for receiving the sensing signal 515, while the receiver 446 is coupled to the virtual key touch sensor 420 for receiving the virtual key sensing signal 525. The transmitter 442 is coupled to the touch sensor 415, the virtual key touch sensor 420, and the receivers 444 and 446. The transmitter 442 sends the driving signal 511 to the touch sensor 415 and sends a control signal 450 to trigger the receiver 444 to receive the sensing signal 515. In addition, the transmitter 442 sends the virtual key driving signal 521 to the virtual key touch sensor 420 and sends the control signal 450 to trigger the receiver 446 to receive the virtual key sensing signal 525.

Figure 7:
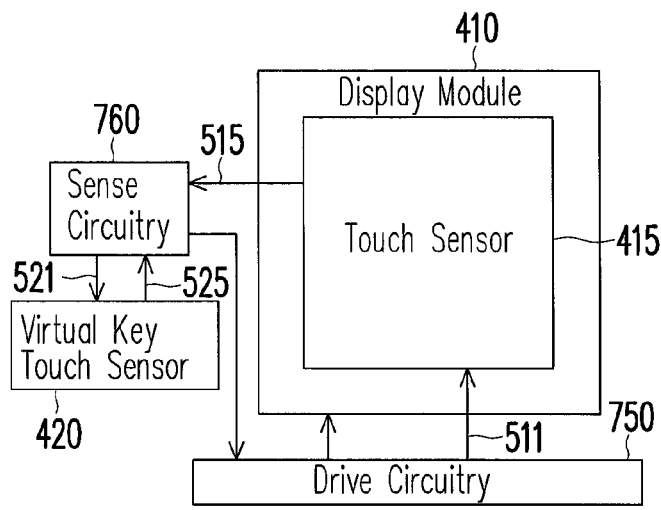
FIG. 7 is a schematic diagram showing a part of a touch-sensitive electronic device according to another embodiment of the present invention.

FIG. 7 is a schematic diagram showing a part of the touch-sensitive electronic device 400 according to another embodiment of the present invention. In this embodiment, the touch-sensitive electronic device 400 includes an display module 410, an touch sensor 415 integrated with the display module 410, a virtual key touch sensor 420, a sense circuitry 760 coupled to the sensor 415 and the virtual key touch sensor 420, and a drive circuitry 750 coupled to the display module 410, the touch sensor 415, and the sense circuitry 760. The drive circuitry 750 drives the display module 410 to display an image, such as the GUI of the electronic device 400. The sense circuitry 760 and the drive circuitry 750 are both physical circuits.

In order to scan the touch sensor 415 and the virtual key touch sensor 420 to detect touch events, the sense circuitry 760 instructs the drive circuitry 750 to provide the driving signal 511 to the touch sensor 415 and the sense circuitry 760 provides the virtual key driving signal 521 to the virtual key touch sensor 420. The touch sensor 415 generates the sensing signal 515 in response to the driving signal 511. The sense circuitry 760 receives the analyzes the sensing signal 515 and determines the locations of the touch events in the display area 132 based on the analysis of the sensing signal 515. On the other hand, the virtual key touch sensor 420 generates the virtual key sensing signal 525 in response to the virtual key driving signal 521. The sense circuitry 760 receives the analyzes the virtual key sensing signal 525 and determines the locations of the touch events in the virtual key area 133 based on the analysis of the virtual key sensing signal 525. The electronic device 400 may perform functions based on the locations of the touch events detected by the sense circuitry 760.

In an embodiment of the present invention, the sense circuitry 760 may instruct the drive circuitry 750 to provide the driving signal 511 to the touch sensor 415 according to a first timing. The sense circuitry may provide the virtual key driving signal 521 to the virtual key touch sensor 420 according to a second timing. The first timing and the second timing are different such that the scanning of the touch sensor 415 does not interfere with the scanning of the virtual key touch sensor 420.

In another embodiment of the present invention, the sense circuitry 760 may instruct the drive circuitry 750 to provide the driving signal 511 to the touch sensor 415 at a first frequency. The sense circuitry may provide the virtual key driving signal 521 to the virtual key touch sensor 420 at a second frequency. The first frequency and the second frequency are different such that the scanning of the touch sensor 415 does not interfere with the scanning of the virtual key touch sensor 420.

Figure 8:
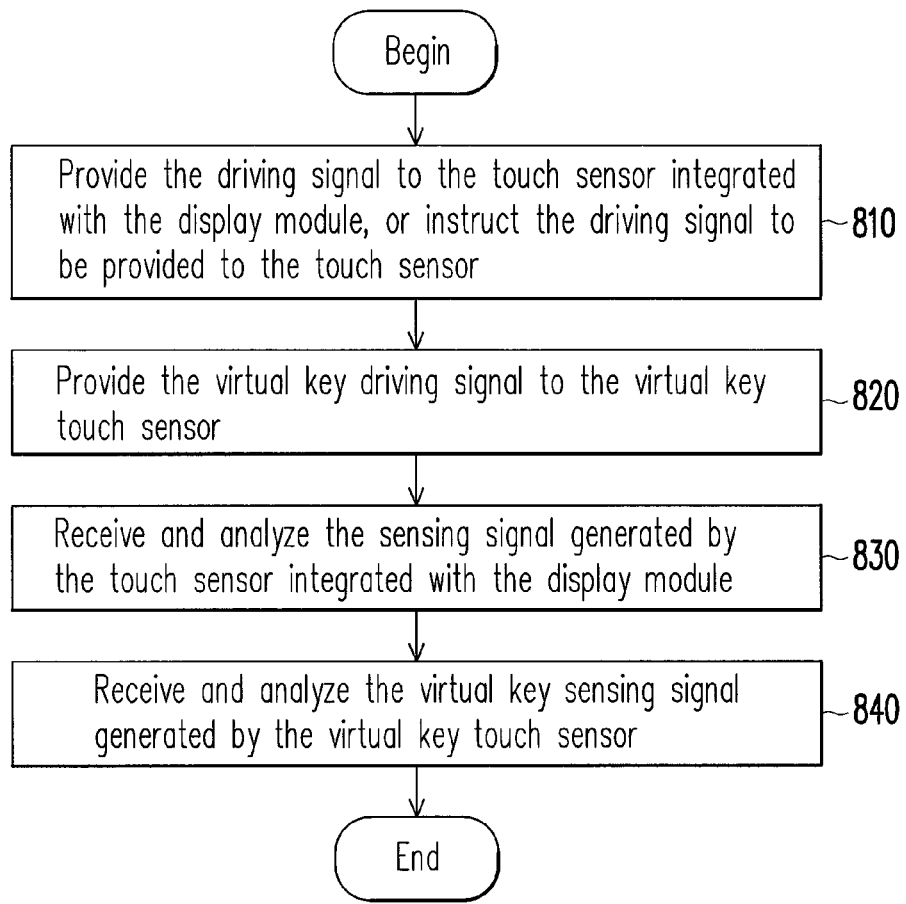
FIG. 8 is a schematic diagram showing the flow of a touch-sensing method according to an embodiment of the present invention.

FIG. 8 is a schematic diagram showing the flow of a touch-sensing method according to an embodiment of the present invention. The touch-sensing method includes the following steps, which may be executed by the touch-sensing electronic device 400 shown in FIG. 5, FIG. 6 or FIG. 7. In step 810, provide the driving signal 511 to the touch sensor 415 integrated with the display module 410, or instruct the driving signal 511 to be provided to the touch sensor 415. In step 820, provide the virtual key driving signal 521 to the virtual key touch sensor 420. In step 830, receive and analyze the sensing signal 515 generated by the touch sensor 415 in response to the driving signal 511. In step 840, receive and analyze the virtual key sensing signal 525 generated by the virtual key touch sensor 420 in response to the virtual key driving signal 521.

The other details of the touch-sensing method are already elaborated on in the aforementioned embodiments of the present invention. Therefore, the details are not repeated here.

The aforementioned embodiments of the present invention scan the touch sensor and the virtual key touch sensor by receiving and analyzing the sensing signal and the virtual key sensing signal respectively. The present invention is not limited to the touch sensor and the virtual key touch sensor. The other embodiments of the present invention may scan a plurality of arbitrary touch sensors by receiving and analyzing their sensing signals respectively.

In summary, the present invention uses a single sense circuitry to scan at least two touch sensors. One of the touch sensors may be used to detect touch events in the display area of an electronic device. The other one of the touch sensors may be used to detect touch events in the virtual key area of the electronic device. By using a single sense circuitry instead of two sense circuitries, the present invention reduces the cost and complexity of the electronic device. In addition, the present invention may increase the effectiveness, efficiency and user satisfaction with touch-sensitive electronic devices by using a stand-alone touch sensor to detect touch events on the virtual keys.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a display module integrated with a first touch sensor, wherein the first touch sensor generates a first sensing signal in response to a first driving signal;
   a second touch sensor, generating a second sensing signal in response to a second driving signal;
   a drive circuitry, coupled to the display module and the first touch sensor, the drive circuitry generating the first driving signal to drive the first touch sensor when instructed by a sense circuitry and driving the display module for displaying an image; and
   the sense circuitry, coupled to the first and the second touch sensors, the sense circuitry generating the second driving signal to drive the second touch sensor,
   the sense circuitry receiving and analyzing the first sensing signal to sense a touch on the first touch sensor and
   the sense circuitry receiving and analyzing the second sensing signal to sense a touch on the second touch sensor;
   wherein the drive circuitry to provide the first driving signal to the first touch sensor according to a first frequency, and the sense circuitry provides the second driving signal to the second touch sensor according to a second frequency, the first frequency and the second frequency are different.

2. The electronic device of claim 1, wherein the sense circuitry provides the first driving signal to the first touch sensor according to a first timing and provides the second driving signal to the second touch sensor according to a second timing, the first timing and the second timing are different.

3. The electronic device of claim 1, wherein the sense circuitry simultaneously sends the first and the second driving signals through a same output terminal to the first and the second touch sensors, respectively.

4. The electronic device of claim 1, wherein the sense circuitry comprises:
   a first receiver coupled to the first touch sensor, receiving the first sensing signal;
   a second receiver coupled to the second touch sensor, receiving the second sensing signal; and
   a transmitter coupled to the first and the second touch sensors and the first and the second receivers, sending the first driving signal to the first touch sensor and sending a control signal to trigger the first receiver to receive the first sensing signal, sending the second driving signal to the second touch sensor and sending the control signal to trigger the second receiver to receive the second sensing signal.

5. The electronic device of claim 1, wherein the sense circuitry instructs the drive circuitry to provide the first driving signal to the first touch sensor according to a first timing, the sense circuitry provides the second driving signal to the second touch sensor according to a second timing, the first timing and the second timing are different.

6. A touch-sensing method for an electronic device having a display module integrated with a first touch sensor, a second touch sensor, a drive circuitry, coupled to the display module and the first touch sensor, and a sense circuitry coupled to the first and second touch sensor, comprising
   the sense circuitry configured to:
   instruct a first driving signal to be provided to the first touch sensor by the drive circuitry according to a first frequency;
   provide a second driving signal to drive the second touch sensor according to a second frequency;
   receive and analyze a first sensing signal generated by the first touch sensor in response to the first driving signal sensor;
   receive and analyze a second sensing signal generated by the second touch sensor in response to the second driving signal sensor,
   wherein the first frequency and the second frequency are different.

7. The touch-sensing method of claim 6, further comprising:

driving the display module to display an image by a drive circuitry.

8. The touch-sensing method of claim 7, further comprising:
   instructing the drive circuitry to provide the first driving signal to the first touch sensor according to a first timing; and
   providing the second driving signal to the second touch sensor according to a second timing, wherein the first timing and the second timing are different.

9. The touch-sensing method of claim 6, furthering comprising:
   providing the first driving signal to the first touch sensor according to a first timing; and
   providing the second driving signal to the second touch sensor according to a second timing, wherein the first timing and the second timing are different.

10. The electronic device of claim 6, wherein the sense circuitry simultaneously sends the first and the second driving signals through a same output terminal to the first and the second touch sensors, respectively.

11. The touch-sensing method of claim 6, further comprising:
   sending the first driving signal to the first touch sensor and sending a control signal to trigger the receiving of the first sensing signal; and
   sending the second driving signal to the second touch sensor and sending the control signal to trigger the receiving of the second sensing signal.

* * * * *